(12) United States Patent
Reddy (10) Patent No.: US 8,909,857 B2
(45) Date of Patent: Dec. 9, 2014

(54) EFFICIENT STORAGE OF ACL FREQUENT RANGES IN A TERNARY MEMORY

(75) Inventor: Parineeth M. Reddy, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 168 days.

(21) Appl. No.: 13/538,651

(22) Filed: Jun. 29, 2012

(65) Prior Publication Data

US 2014/0006535 A1    Jan. 2, 2014

(51) Int. Cl.
*G06F 15/167* (2006.01)

(52) U.S. Cl.
USPC ..... 711/108; 365/49.1; 365/49.16; 365/49.17

(58) Field of Classification Search
CPC .................. G06F 15/167; G06F 17/30982
USPC ........................................ 709/212
See application file for complete search history.

(56) References Cited

U.S. PATENT DOCUMENTS

| | | | | |
|---|---|---|---|---|
| 5,467,070 | A * | 11/1995 | Drori et al. | 340/426.36 |
| 6,633,953 | B2 * | 10/2003 | Stark | 711/108 |
| 6,775,737 | B1 * | 8/2004 | Warkhede et al. | 711/108 |
| 7,555,594 | B2 * | 6/2009 | Venkatachary | 711/108 |
| 7,957,387 | B2 * | 6/2011 | Engbersen et al. | 370/392 |
| 8,068,742 | B2 * | 11/2011 | Cole et al. | 398/152 |
| 8,576,841 | B2 * | 11/2013 | Ramaraj et al. | 370/389 |

OTHER PUBLICATIONS

Faezipour et al, "A Customized TCAM Architecture for Multi-Match Packet Classification", IEEE GLOBECOM 2006 proceedings.*
Chang et al, "Efficient Gray Code Based Range Encoding Schemes for Packet Classification in TCAM", IEEE GLOBECOM 2007 proceedings.*

* cited by examiner

*Primary Examiner* — Kevin Bates
*Assistant Examiner* — Chen-Liang Huang
(74) *Attorney, Agent, or Firm* — Sterne, Kessler, Goldstein & Fox PLLC (57) ABSTRACT

Incoming data packets are often processed according to their origination or destination port. In order to efficiently determine applicable rules based on port values, ranges are stored in association with corresponding rules in a ternary memory. In order to reduce the amount of required memory to store these ranges, extra unused bits of the ACL that includes the rule can be used. Further, to maximize the storage capability of these limited extra bits, most common ranges can be stored in one or more bit partitions depending on whether they encompass other most common ranges to be stored in the extra bits. Through partitioning and intelligent bit assignment, many ranges can be stored in the limited extra bits, and can each remain individually addressable.

20 Claims, 7 Drawing Sheets

EFFICIENT STORAGE OF ACL FREQUENT RANGES IN A TERNARY MEMORY

BACKGROUND

1. Field of Invention

The disclosure relates to ternary storage of data items, multiple of which may need to be associated with a single bit code, and more particularly to the ternary identification of frequent ranges associated with rules contained with Access Control Lists (ACLs).

2. Related Art

Communication devices, such as routers and servers are commonly used in both corporate and personal settings to handle data and network throughput. These communication devices provide users with cross-communication abilities between devices, as well as the ability to communicate over larger networks like the internet.

In order to properly process incoming data packets, a communication device must accurately identify the actions to be performed on each packet. The actions to be performed are stored as rules associated with an Access Control List (ACL). The communication device selects a rule to be performed on a received packet based on the packet's source port and/or destination port. However, each rule may be applicable to several ports, and consequently can require several data entries in a Ternary Content Addressable Memory (TCAM).

TCAMs are memory devices used for representing ternary data entries. A ternary entry consists not only of 0 s and 1 s, but also x (immaterial if a 0 or a 1).

One conventional method for storing such ranges is known as prefix expansion. In this method, if the range field is 16 bits wide and the communication device is representing a range (2, 4), then it represents the range using two entries: Entry 1—000000000000001x; and Entry 2—0000000000000100. Using this approach, if the range field is W bits wide, then the worst case number of entries required to represent the range is 2 W-2.

Because of the large number of entries required, this representation poses a significant storage problem for larger ranges. For example, if a particular ACL requires storing both a source port and a destination port, and the width of the ports are 16 bits each, then the number of entries required is (2*16−2)*(2*16−2)=30*30=900 entries. As such, the conventional approach requires a significant number of entries to represent only a single range. Other approaches suffer from similar problems.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the following description is to be described in terms of packet communication (specifically within a router), those skilled in the relevant art(s) will recognize that this description may also be applicable to other communications that use other communication protocols and/or which are performed within a server or communication end user, such as a cellular telephone, laptop computer, PDA, etc.

An Exemplary Wireless Communications Environment

Figure 1:
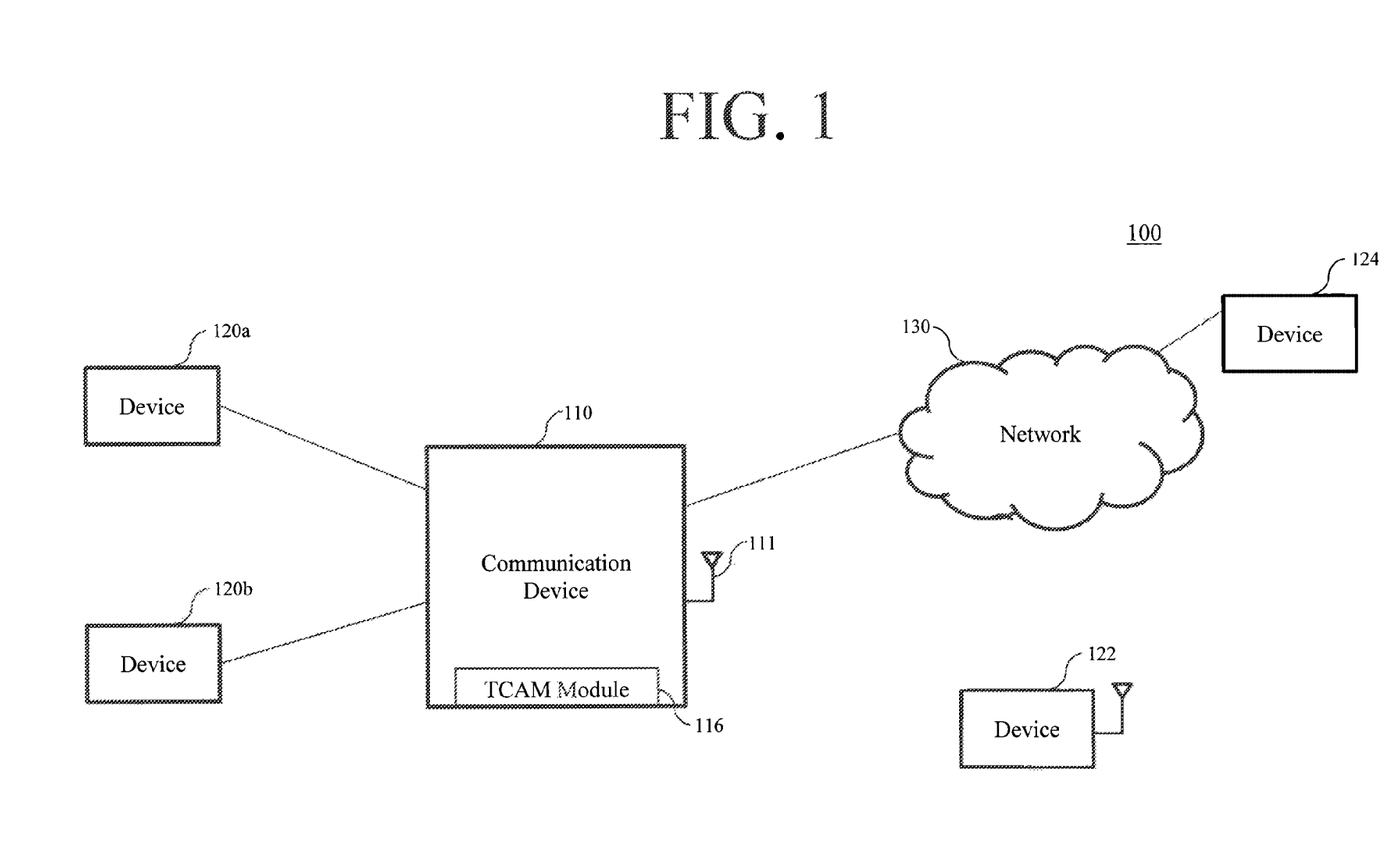
FIG. 1 illustrates a block diagram of an exemplary communication environment.

FIG. 1 illustrates a block diagram of an exemplary communication environment 100. The communication environment 100 provides communication of information, such as one or more commands and/or data, between communication devices. The communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

The exemplary wireless communication environment 100 includes a communication device 110. The communication device 110 includes a TCAM module 116 according to the present disclosure, and optionally includes a wireless antenna 11 for wireless communication with other wireless communication devices. For purposes of this discussion, the communication device 110 functions as a router that processes and forwards data packets received from one or more communication devices in the communication environment 100 to other communication devices in the communication environment 100.

Such devices may include devices 120a and 120b which are hard-wire connected to the communication device and a wireless communication device 122 that wirelessly communicates with the communication device 110. The communication device 110, the devices 120a and 120b, and the wireless device 122 may all be located within a home network, femtocell or other small local area network. The communication device 110 may also be capable of communicating with out-of-network devices (i.e., device 124) via a larger network 130 (e.g., Internet).

The TCAM module 116 of the communication device 110 stores ACLs and processes received packets from the various devices in accordance with the present disclosure, and therefore requires significantly fewer TCAM entries for storing ACL ranges.

Detailed functionality of the communication device, and of the TCAM module 116, is discussed below with respect to the relevant figures.

Exemplary Router

Figure 2:
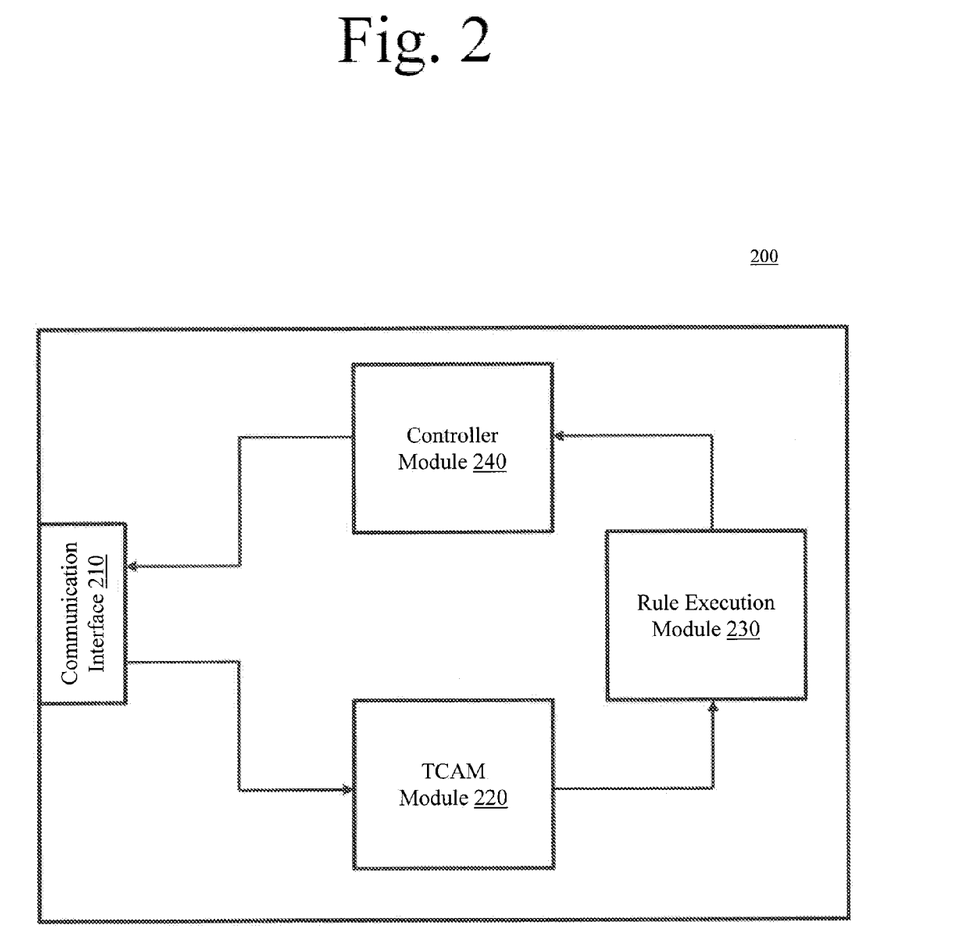
FIG. 2 illustrates a block diagram of an exemplary communication device that may be implemented within the communication environment.

FIG. 2 illustrates a block diagram of an exemplary communication device 200 that may be implemented within the communication environment 100. The communication device 200 includes a TCAM module 220 and a rule execution module 230, and may represent an exemplary embodiment of the communication device 110.

In the communication device 200, the TCAM module 220 stores ACL ranges in accordance with the present disclosure. The communication device 200 receives data packets from external devices via its communication interface 210 that may include a plurality of source and/or destination ports. These packets are forwarded to the TCAM module 220 for rule determination.

Each packet received includes source and/or destination port information, which the TCAM module 220 encodes. Based on the encoded port information, the TCAM module 220 identifies applicable rules, and then selects a rule for application based on rule priority information. The TCAM module 220 forwards the data packet to the rule execution module 230 along with the selected rule, which executes the selected rule on the received data packet.

The rule execution module 230 forwards the processed data packet to a controller module 240 for performing any necessary additional processes before being forwarded back to the communication interface 210. The communication interface 210 then transmits a response packet to the originating device and/or forwards data information to another device within the communication environment 100.

Exemplary Tcam Module

Figure 3:
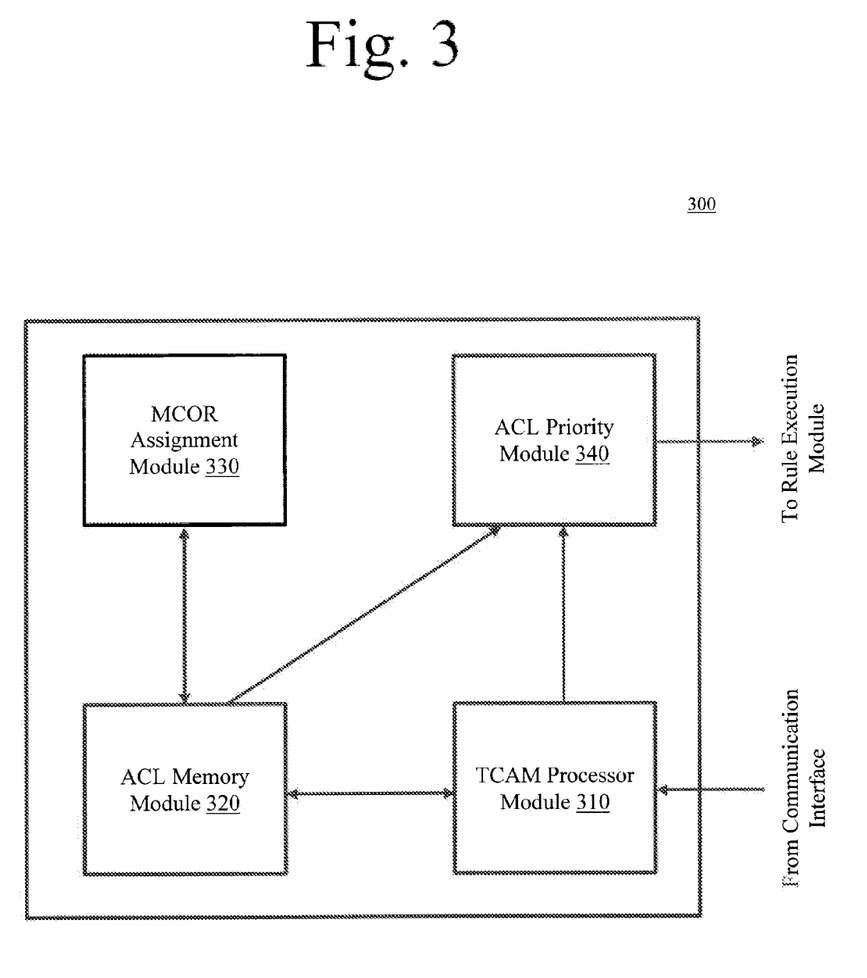
FIG. 3 illustrates a block diagram of an exemplary TCAM module that may be implemented within the configurable radio module.

FIG. 3 illustrates a block diagram of an exemplary TCAM module 300. The TCAM module includes a TCAM processor module 310 and a Most Commonly Occurring Range (MCOR) assignment module 330, and may represent an exemplary embodiment of the TCAM module 220.

The TCAM module 300 performs two primary functions: (1) encoding and storing the ranges associated with the various rules; and (2) encoding the port information of a received packet and selecting a rule based on the encoded port information. Herein, encoding the ranges may be interpreted as arranging the ranges into extra memory capacity. In this manner, incoming data packets can be properly processed within the router 200.

1. Introduction

The ACL memory module 320 is a TCAM-type memory that stores the ACLs and their corresponding ranges. In the ACL memory module 320, each ACL may use only a subset of the allocated number of bits available. For example, the ACLs may only occupy 56 bits of a 64-bit memory allocation, thus leaving 8 unused bits that can be used for storing the encoded range associated with the ACL.

In order to take advantage of the spare bits, an MCOR assignment module 330 determines and stores the Most Commonly Occurring Ranges (MCORs). These ranges correspond to those most often applied to incoming data packets. The MCORs may be preset by an end user of the router, or may be determined by the MCOR assignment module 330. For example, the MCOR assignment module 330 may track usage statistics of the various rules and their corresponding ranges and generate/update the list of MCORs based on their usage statistics.

In addition to determining the MCORs, the MCOR assignment module 330 also encodes the entries in the ACL memory module 320 based on the MCORs. In particular, the MCOR assignment module 330 determines the number of extra bits contained within the ACL entries. The MCOR assignment module 330 then encodes one or more of the MCOR ranges to fill these extra bits. The MCOR assignment module 330 then encodes the remaining ranges (e.g., extra MCOR ranges and non-MCOR ranges) in accordance with conventional methods to occupy the designated port bits associated with the remaining ACLs stored in the ACL memory module 320.

2. Conventional Range Encoding

As discussed above, employing conventional range encoding techniques requires several entries, which requires a large memory capacity and potentially induces latencies from having to search a larger database. Therefore, in order to minimize the number of entries required to be stored in the ACL memory module 320, once the MCOR assignment module 330 has determined the number of available unused bits in the ACL entries, the MCOR module 330 initiates the following encoding algorithm, designed efficiently use the unused bits of the entries to store a large number of ranges.

In the encoding algorithm, the MCOR assignment module 330 establishes virtual partitions within the unused bits of the ACL entries so as to allow for a unique addressing scheme that increases the number of MCORs capable of being stored in the extra bits.

In an example, presume that there are three extra bits, and that the MCOR assignment module 330 includes three MCORs: (30, 40), (35, 45), and (50, 60). Because the number of available bits is the same as the number of MCORs, the MCOR assignment module 330 can simply assign each of the MCORs its own bit, as shown in Table 1:

TABLE 1

| Range | Encoded Extra Bits In TCAM | Encoded Port Bits in TCAM |
|---|---|---|
| (30, 40) | xx1 | xxx |
| (35, 45) | x1x | xxx |
| (50, 60) | 1xx | xxx |
| Other | xxx | Conventional |

With this configuration, upon receiving a packet from the communication environment 100, the TCAM processor 310 can simply encode the extra bits of the packet's key to have the corresponding "1" bits of the ranges that the port falls within. For example, the packet ports may be encoded as follows:

TABLE 2

| Port Number | Encoded Extra Bits of Key | Matched Frequent Range |
|---|---|---|
| 9 | 000 | None |
| 31 | 001 | (30, 40) |
| 37 | 011 | (30, 40), (35, 45) |
| 44 | 010 | (35, 45) |
| 50 | 100 | (50, 60) |

As shown in Table 2, above, in order to match the port of the received packet with the corresponding range stored in the extra bits of the ACL entries, the TCAM processor 310 simply encodes the port information of the packets to include the bits corresponding to the frequent ranges within the port falls. In other words, the ports are encoded to have "1" bits in corresponding locations as the "1"-bit locations assigned to the ranges within that port falls.

For example, as shown above, port 37 is encoded with 011 because it falls within both range (30, 40)-xx1 and (35, 45)-x1x, but does not fall within range 50-60-1xx.

3. Range Encoding According to an Embodiment of the Disclosure

Typical routers often include several MCORs that far exceed the number of available extra bits in the ACL entries. In this situation, the MCOR assignment module 330 establishes one or more virtual partitions in the extra bits of the ACL entries, which allows for storage of additional MCORs.

In particular, the MCOR assignment module 330 establishes a first partition for non-overlapping ranges and a second partition for overlapping ranges, and uses one or more of the extra bits in the ACL entries to address between the two.

As shown in the above example, because there are only three available extra bits, the MCOR assignment module 330 is only capable of encoding three MCORs using the above method. Therefore, if a fourth MCOR is introduced, one of the MCORs will not be encoded and no more efficiency is gained. However, by partitioning the extra bits of the ACL entries and encoding in such a way as to address to the different partitions, even the fourth MCOR can be encoded in the available three extra bits.

For example, assume that the MCOR assignment module 330 includes four MCORs: (30, 40), (35, 45), (50, 60), and (10, 20). In order to encode these MCORs using only the available three extra bits, the MCOR assignment module 330 removes overlapping ranges so that only non-overlapping ranges remain. In this example, the MCOR assignment module 330 removes (30, 40) because it overlaps with (35, 45), leaving only (10, 20), (35, 45), and (50, 60) remaining, none of which overlap each other.

Because only one MCOR was removed as overlapping, it can be represented using only a single bit. Consequently, two of the three extra bits remain for assignment to the non-overlapping ranges. The MCOR assignment module 330 simply assigns each of those non-overlapping ranges a unique two-bit code. In this manner, the three extra bits have been virtually partitioned into a 2-bit non-overlapping partition and a 1-bit overlapping partition, as follows:

TABLE 3

| Range | Encoded First Partition Bits in TCAM | Encoded Second Partition Bits in TCAM | Encoded Port Bits |
|---|---|---|---|
| (30, 40) | xx | 1 | xxx |
| (10, 20) | 01 | x | xxx |
| (35, 45) | 10 | x | xxx |
| (50, 60) | 11 | x | xxx |
| Other | xx | x | Conventional |

As shown in Table 3, using this unique encoding scheme, all four MCORs can be encoded into the three extra bits, thereby further reducing required memory space. In this example, the overlapping range (30, 40) includes a "1" bit in the overlapping partition. Similarly, the three non-overlapping ranges are given unique 2-bit identifiers in the non-overlapping partition.

It is important to note that several additional ranges may also be relevant to the router, but are not included in the MCORs. Those additional ranges may be overlapping or non-overlapping with any of the ranges included in the encoded MCORs. Therefore, "other" ranges are represented in Table 3 as "xxx." Accordingly, upon receipt of a packet whose port does not fall within these specially-encoded ranges, the TCAM processor module 310 encodes its port to have "000" in its key so as to identify it as not corresponding to any of these ranges. Alternatively, upon receipt of a packet whose port falls not only within one of the encoded MCORs, but also in a non-MCOR range, the TCAM processor module 310 encodes the range according to its corresponding MCOR. In either circumstance, the ACL memory module 320 will also search for the port of the received packet with its corresponding ACL entries based on the encoded port bits of the ACL entries that were encoded using conventional methods.

By partitioning the available extra bits into overlapping and non-overlapping partitions, and by providing each of the ranges with their own unique bit codes, the number of ranges that can be stored in the limited number of available extra bits is improved. In addition, each of the MCORs in which a received packet's port falls can be identified with a single bit code.

It should be understood that, although the above description relates to a 2-level partitioning scheme (2 partitions), substantially similar operations can be performed to generate higher-level partitioning schemes where necessary or desired. As an example, the ranges of the overlapping partition may include ranges that overlap each other. In this case, the overlapping ranges may be extracted and placed into a third partition. This operation may be repeated until each individual partition includes only non-overlapping ranges.

4. Port Encoding According to an Embodiment

With the MCORs and other ranges encoded in the ACL memory module 320, the TCAM module 300 can encode ports of received packets so as to identify the corresponding ranges.

As discussed above, an incoming packet is received at the communication interface 210, which forwards the received packet to the TCAM module 300. The TCAM processor module 310 receives the packet and extracts its port information. This port information may be the originating port number and/or the destination port number of the packet. The TCAM processor module 310 then encodes the extracted port number in accordance with codes assigned to the various ACLs.

For example, the port number may fall within several non-MCOR ranges. The TCAM processor module 310 encodes the port for these ranges using conventional methods, such as prefix expansion, Database Independent Range Encoding (DIRPE), etc. In addition, the TCAM processor module 310 also identifies the MCORs within which the port falls, and encodes the extra bits of a key of the port in accordance with the rules defined during the generation and storage of the encoded ACLs in the ACL memory module 320.

In other words, once the TCAM processor module 310 has generated the key for the port, the TCAM processor module 310 identifies the MCORs that include the port of the received packet. The TCAM processor module 310 then encodes the extra bits of the key to have corresponding bit locations include the unique codes of the ranges that include the port. For example, using the above 3-bit example, the TCAM processor module 310 encodes the most significant 2 bits of the port's key's extra bits to include the 2-bit identifier of the corresponding non-overlapping partition range stored in the ACL memory module 320 and encodes the least significant 1 bit of the key to include the 1-Lit identifier of the overlapping partition range stored in the ACL memory module 320, as shown in the example below for packets having port identifiers 9, 15, 31, 37, 44, 47, 55 and 65:

TABLE 4

| Port Number | Extra Bits of Key - First Partition | Extra Bits of Key - Second Partition | Matched Frequent Ranges |
|---|---|---|---|
| 9 | 00 | 0 | None |
| 15 | 01 | 0 | (10, 20) |
| 31 | 00 | 1 | (30, 40) |
| 37 | 10 | 1 | (30, 40), (35, 45) |
| 44 | 10 | 0 | (35, 45) |
| 47 | 00 | 0 | None |
| 55 | 11 | 0 | (50, 60) |
| 65 | 00 | 0 | None |

As shown in Table 4, for a packet whose port is 47, the TCAM processor module 310 encodes the extra bits of the key to be "000" so as to indicate that the port does not fall within any of the stored MCORs. Likewise, the TCAM processor module encodes the extra bits of the key to be "110" for a packet whose port is 55 to indicate that the port falls within the MCOR (50, 60) (whose unique identifier is "11" in the most significant 2 bits), but does not fall within the range (30, 40) (whose unique identifier is "1" in the least significant 1 bit). For a port 37, the TCAM processor module 310 encodes the extra bits of the key to be "101" because it falls within both the range (35, 45) (whose unique code is "10" in the most significant 2 bits) and (30, 40) (whose unique code is "1" in the least significant 1 bit).

Once the key has been generated by the TCAM processor module 310, the TCAM processor module 310 forwards the key to the ACL priority module 340. The ACL priority module 340 determines, based on the key, which rules apply to the received port. The ACL priority module 340 then selects one rule from among the applicable rule to be performed on the received packet. The ACL priority module 340 selects the rule based on internally-stored priority information that dictates the hierarchy of rule application. In other words, for the packet whose port is 37, two MCOR (and possible additional non-MCOR) rules can apply. Based on priority information, the ACL priority module 340 may determine that the rule associated with range (30, 40) takes precedence, and therefore will be applied. Once the rule has been selected, the ACL priority module 340 forwards the result to the rule execution module 230 for processing the packet.

5. Bit Tracking

During encoding of the MCORs, the MCOR assignment module 330 must track the number of bits used by the encoding process. This may be needed in order to determine whether an additional MCOR will fit in the available extra bits, or to determine how many bits are required to store a particular set of MCORs.

As illustrated in the above tables, the first n-bit partition is capable of storing $2^n-1$ MCORs (because one entry (e.g., the 0 entry) is to be reserved for a non-listed range) and additional m-bit partitions may be capable of storing m−1 MCORs. Further, any new partition requires 1 bit to start. Thus, when encoding a listing of MCORs, the MCOR assignment module 330 can determine whether space exists for a new MCOR by determining which partition the MCOR is to be assigned.

If the partition is a new partition, the MCOR assignment module 330 determines if there are one or more unused available extra bits to support the new partition. If there is not, then the MCOR may not be stored.

If the MCOR is to be assigned to an existing partition, then the MCOR assignment module 330 determines how many MCORs are currently stored in that partition and compares that number to the maximum number of possible MCORs that can be stored in the partition. If the partition does not include a maximum number of MCORs, then the MCOR assignment module 330 adds the current MCOR to the partition. If the partition does include a maximum number of MCORs, then the MCOR assignment module 330 determines whether additional unused bits are available to expand the partition. If an unused bit is available, then the MCOR assignment module 330 expands the partition by 1 bit and adds the current MCOR. If there are no unused bits available, then the MCOR assignment module does not store the current MCOR.

Even after the MCOR assignment module 330 has determined that MCORs cannot be stored, the MCOR assignment module 330 may nonetheless determine that additional space remains in one or more other partitions. Thus, the MCOR assignment module 330 can seek other MCORs from the list to fill these positions in order to fully utilize all available bits. In this manner, the MCOR assignment module 330 is able to track the number of used and available spaces within the extra bits.

Exemplary Method of Encoding MCORs

Figure 4:
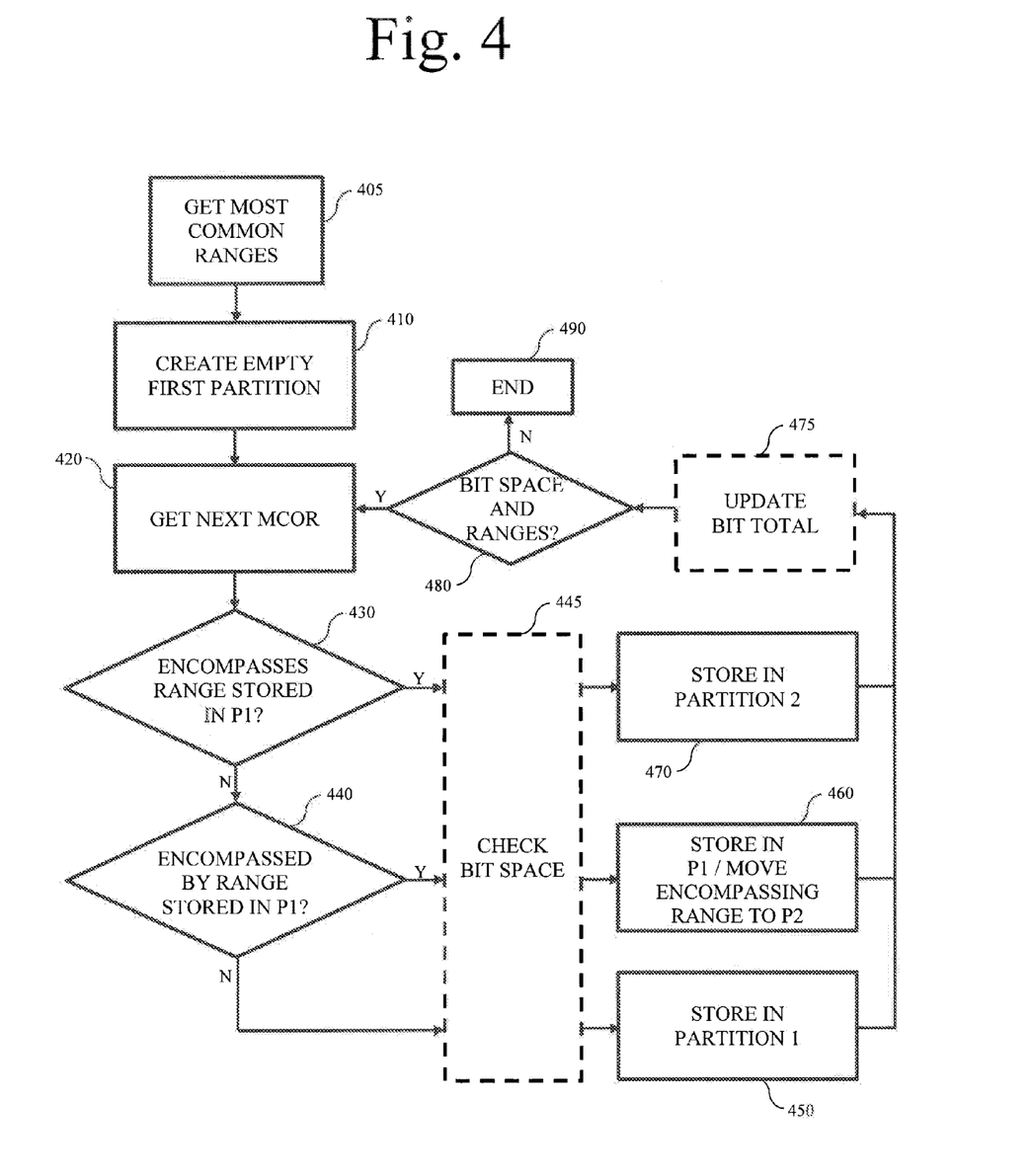
FIG. 4 illustrates a block diagram of an exemplary MCOR encoding method.

FIG. 4 illustrates a block diagram of an exemplary MCOR, encoding method. The method assumes that there is at least one extra bit in the ACL that can be used for the unique encoding method.

First, the MCORs are determined 405. These MCORs may be preset or may be determined based on statistical data gathered over time. Once the MCORs have been determined, an empty partition is generated 410. Once the partition has been created, the next MCOR can be retrieved from the MCOR list 420. Immediately after the partition has been created, the next MCOR will be the first MCOR of the list.

A determination is then made as to whether the retrieved current MCOR encompasses a current range stored in the first partition 430. If the range of the MCOR does encompass a range currently stored in the first partition (430-Y), the MCOR is stored in a second partition 470 provided that there is bit space 445 (discussed below). The second partition is created if it does not already exist.

If, on the other hand, the current range does not encompass another range that is currently stored in the first partition (430-N), a determination is made as to whether the current range is encompassed by a range currently stored in the first partition 440. If the current range is encompassed by a range stored in the first partition (440-Y), the range that was previously stored in the first partition is moved to the second partition and the current range is stored in the first partition 460 provided that there is bit space 445. If the current range is not encompassed by a range currently stored in the first partition, then the current range is stored in the first partition 450 provided that there is bit space 445.

In case one or more pairs of ranges in the first partition overlap with each other, the first partition is sub-divided into two sub-partitions, the first sub-partition having non-overlapping ranges and the second sub-partition having ranges that overlap with ranges in the first sub-partition. The overlapping ranges are temporarily stored in the first partition and are eventually moved to the second partition.

Once the current MCOR has been stored in a partition, the bit usage total is updated 475 and a determination is made as to whether there is any additional storage space in the extra bits and whether any additional MCORs remain for storing 480. If there is additional space and there are remaining MCORs (480-Y), then the method repeats steps 420-480. If there is not additional space, or if there are no remaining MCORs (480-N), then the method ends 490.

It should be noted that the bit space determination 445 and the updating of the bit total 475 may only be necessary where there exists a limited number of bits for use in the encoding process.

Figure 5:
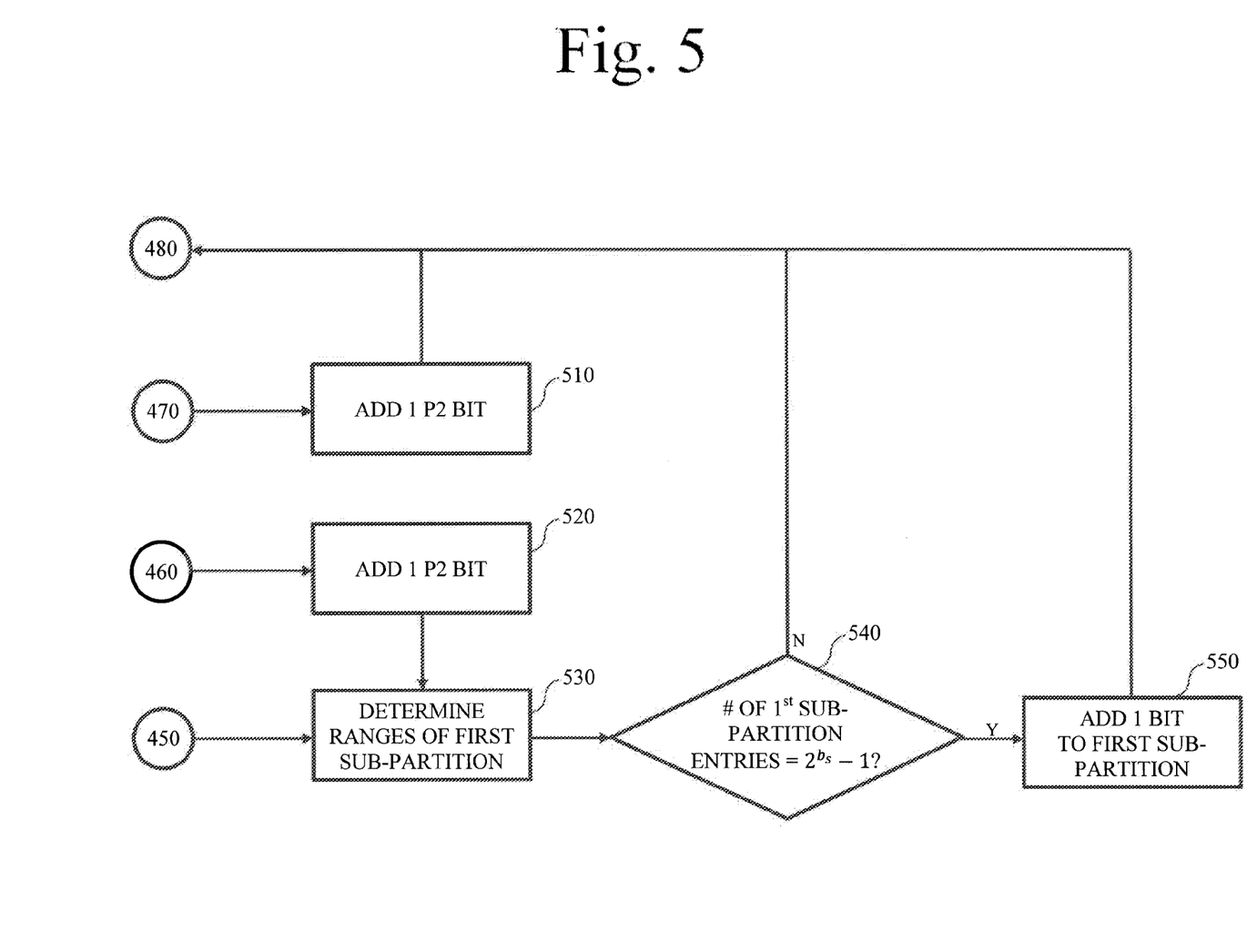
FIG. 5 illustrates a block diagram of an exemplary bit adjustment method that may be implemented within the MCOR encoding method.

FIG. 5 illustrates a block diagram of an exemplary bit adjustment method that may be implemented within the MCOR encoding method. This method allows the total number of bits required for storing the MCORs to be updated. In addition, by performing this method prior to storing the latest MCOR, it can be determined whether space exists for the MCOR based on the total number of available bits.

As discussed above, MCORs are removed from the first partition when they fully encompass another MCOR stored in the first partition. However, there may be several MCORs that partially overlap each other. In order to maximize bit usage, the first sub-partition of the first partition comprising of non-overlapping ranges of the first partition is determined. To compute the ranges of the first sub-partition, the ranges of the first partition are first sorted based on the port values. The ranges are inspected one by one in ascending (or descending) order of their port values. If a range doesn't overlap with the ranges already in the first sub-partition, then it is added to the first sub-partition.

Once the first sub-partition has been determined 530, a determination is made as to whether the number of entries already stored in the first sub-partition is at a maximum. This is done by comparing, for a $b_s$-bit sub-partition, the number of entries already stored in the first sub-partition to $2^{b_s}-1$. If the number of entries is equal to this value (540-Y), then the first sub-partition is increased by one bit to allow space for the new entry 550. If the number of entries is not equal to the maximum (540-N), then the number of bits allocated to the first sub-partition does not change.

If the MCOR is to be added to the second partition 470, the size of the second partition is increased by one bit 510. If a current MCOR is to be added to the first partition, but causes another MCOR to be moved to the second partition 460, a bit is added to the second partition 520. In addition, it must be determined whether the current range is to be placed in the first sub-partition of the first partition 530, whether the number of entries of the first sub-partition is at a maximum 540, and whether the size of the sub-partition must be increased 550.

The number of extra bits used for encoding the MCORs is the sum of the number of bits needed to represent the ranges in the first sub-partition of the first partition, the number of ranges in the second sub-partition of the first partition, and the number of ranges in the second partition. When there are no more MCORs or no more extra bits, the ranges that are not present in the first sub-partition of the first partition are moved to the second partition.

Those skilled in the relevant art(s) will recognize that the above method can additionally or alternatively include any of the functionality of the MCOR assignment module 330 and/or the TCAM module 300, discussed above, as well as any of its modifications. Further, the above description of the exemplary method should neither be construed to limit the method nor the description of the MCOR assignment module 330 and/or the TCAM module 300. In addition, the bit adjustment method may be performed by the TCAM module 300 and/or the MCOR assignment module 330.

MCOR Encoding Example

The following example illustrates several aspects of the functions of the MCOR assignment module 330, as well as the above-described MCOR encoding method. In the example, there are 6 extra bits associated with the ACLs that can be used for MCOR storage and the following list of MCORs has been obtained:

| | | |
|---|---|---|
| (38, 7719) | (500, 1200) | (21, 22) |
| (1000, 2000) | (20000, 28100) | (0, 5000) |
| (0, 10000) | (32000, 61000) | (10, 15) |
| (1500, 2500) | (17000, 18000) | (62500, 63000) |

First, an empty partition is generated and the first MCOR entry is stored therein:

| P1 |
|---|
| (38, 7719) |

Once stored, the next entry (1000, 2000) is retrieved. Because the range (38, 7719) completely encompasses the range (1000, 2000), a new partition is created to store overlapping ranges. The encompassing range (38, 7719) is stored therein and the non-overlapping range (1000, 2000) is stored in the first partition:

| P1 | P2 |
|---|---|
| (1000, 2000) | (38, 7719) |

As discussed above, each second partition range should require a single bit of space for encoding and identification. First partition ranges, on the other hand, can be represented by unique codes. Therefore, in the current MCOR arrangement, one bit is required to represent the first partition range and one bit is required to represent the second partition range.

At this time, the next range (0, 10000) is obtained. Because this range entirely encompasses the range (1000, 2000) that is currently stored in the first partition, the range (0, 10000) is immediately placed in the second partition:

| P1 | P2 |
|---|---|
| (1000, 2000) | (38, 7719) |
| | (0, 10000) |

There are now two bits required to represent the ranges in the second partition and one bit required to represent the range in the first partition. At this time, the next range (1500, 2500) is obtained for encoding. This range overlaps with, but does not encompass and is not encompassed by, the range (1000, 2000) that is currently stored in the first partition. Therefore, the range (1500, 2500) is temporarily stored in the first partition. However, because the range (1500, 2500) overlaps with the range (1000, 2000), they should be placed in separate sub-partitions within the first partition.

| P1 | | P2 |
|---|---|---|
| Sub-partition 1 | Sub-partition 2 | |
| (1500, 2500) | (1000, 2000) | (38, 7719) |
| | | (0, 10000) |

At this time, because the range (1500, 2500) overlaps with the range (1000, 2000), it is necessary to separate these ranges into different sub-partitions to ensure that at least one of the first partition sub-partitions includes only non-overlapping ranges. As discussed above, in order to represent each of the ranges by a unique bit sequence, the sub-partition must include only non-overlapping ranges.

Figure 6:
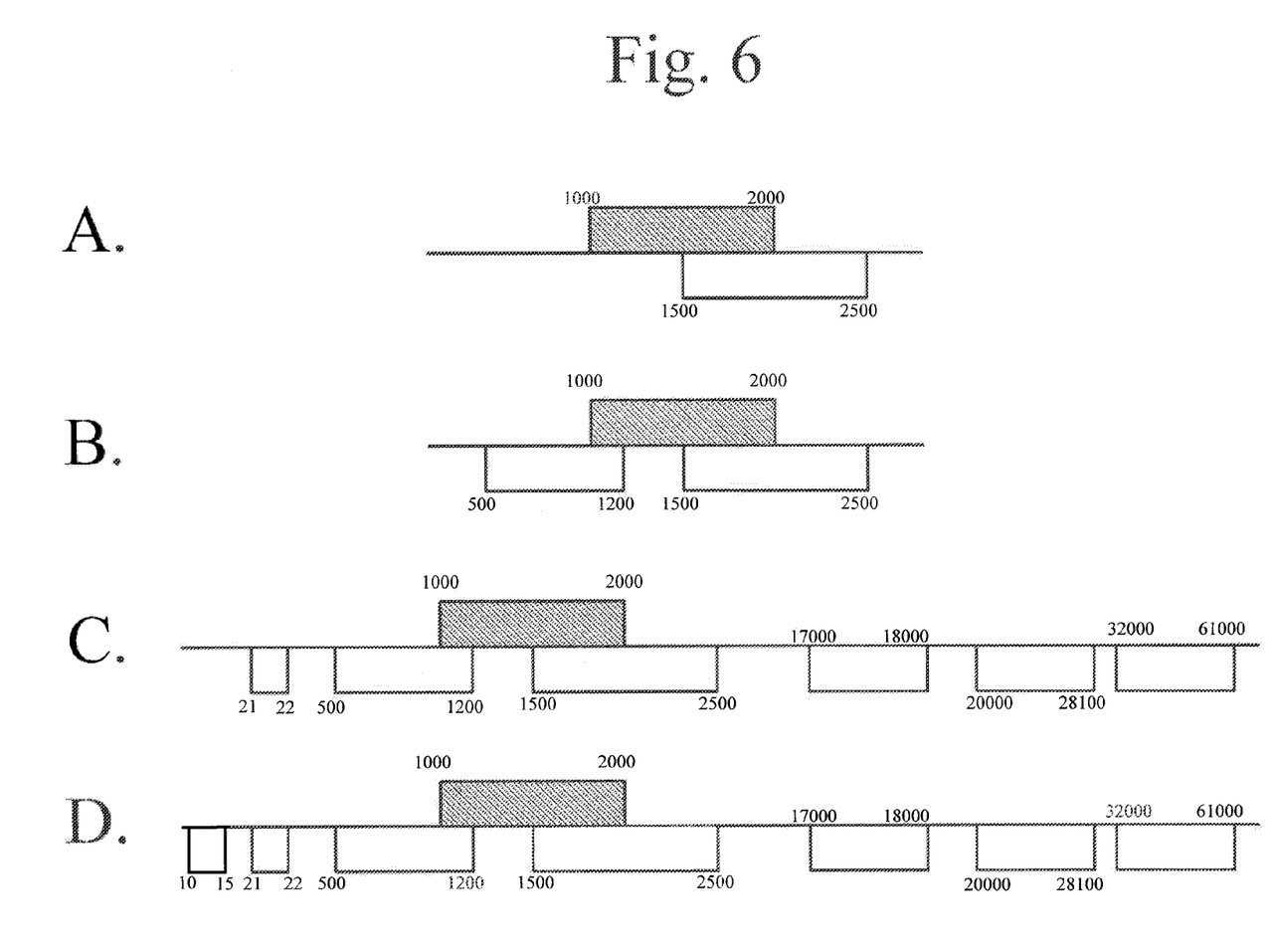
FIG. 6 illustrates a visual depiction of an exemplary MCOR encoding algorithm.

FIG. 6 illustrates a visual representation of the first partition. FIG. 6 is not drawn to scale. As shown in FIG. 6A, the range (1500, 2500) is maintained in a first sub-partition (illustrated in white), while the range (1000, 2000) is maintained in a second sub-partition (illustrated in gray). Consequently, the first sub-partition of the first partition requires one bit for representation and the second sub-partition of the first partition also requires one bit. In addition, the second partition requires two bits for representation corresponding to the two entries contained therein. Consequently, four of the six available bits have currently been allocated.

It should be noted that, although the range (1500, 2500) was placed in the first sub-partition, in many circumstances it may be necessary to later switch the assigned sub-partitions of one or more of the ranges. For example, if the next range were (2100, 3000), it would overlap with (1500, 2500), but not (1000, 2000). Because the first sub-partition should include as many non-overlapping ranges as possible, it would be more efficient for (1500, 2500) to be moved to the second sub-partition, and for (1000, 2000) to be moved back to the first sub-partition. Of course, after the next several ranges were acquired, these ranges may again reverse assigned sub-partitions. Because of the potential for frequent sub-partition reassignments, in an embodiment, the ranges are only organized at intervals or after approaching the bit limits. In other words, the first 8 ranges could be retrieved, immediately designating encompassing ranges for the second partition, but waiting to assign the non-encompassing ranges to one of the sub-partitions of the first partition until all 8 ranges have been acquired.

Continuing with the above example, the next range (500, 1200) is obtained for encoding. This range also does not encompass any range in the first partition. In addition, the range (500, 1200) does not overlap with any of the ranges currently stored in the first sub-partition. Therefore, the range (500, 1200) can be assigned to the first sub-partition, as illustrated in FIG. 6B. Consequently, the partitions are arranged as follows:

| P1 | | P2 |
|---|---|---|
| Sub-partition 1 | Sub-partition 2 | |
| (1500, 2500) | (1000, 2000) | (38, 7719) |
| (500, 1200) | | (0, 10000) |

Because a zero-entry (e.g., a code of all zeros or other unique identifying code) must be allocated in order to identify ranges outside of the stored MCOR values, each sub-partition of the first partition is capable of storing only $2^{b_s}-1$ entries, where $b_s$ is the number of bits currently used by the first sub-partition. Consequently, the first sub-partition of the first partition now requires two bits to store its two entries. The second sub partition still requires one bit, and the second partition still requires two bits. Consequently, five of the six bits have been allocated.

Continuing with the above algorithm, the next several ranges can be added to the first partition because none of those ranges overlap with any of the other ranges previously stored in the first sub-partition, as illustrated in FIG. 6C and as shown below:

| P1 | | P2 |
|---|---|---|
| Sub-partition 1 | Sub-partition 2 | |
| (1500, 2500) | (1000, 2000) | (38, 7719) |
| (500, 1200) | | (0, 10000) |
| (20000, 28100) | | |
| (32000, 61000) | | |
| (17000, 18000) | | |
| (21, 22) | | |

At this time, the first sub-partition of the first partition includes 6 entries and therefore requires 3 bits. The second sub-partition of the first partition still requires 1 bit, and the second partition still requires 2 bits. Consequently, all 6 available bits have been allocated. However, because the first sub-partition uses 3 bits, it is capable of storing up to seven entries. Therefore, it may be possible to store one additional range. Consequently, the next entry (0, 5000) is acquired.

The range (0, 5000), however, encompasses several ranges in the first partition (e.g., (21, 22)). Therefore, the range (0, 5000) should be moved to the second partition. However, doing so would require the allocation of an additional bit, which is not available. Therefore, the range (0, 5000) is not encoded using this method, and is instead encoded using conventional methods. Because space still remains in the first sub-partition, the next range (10, 15) is acquired.

The range (10, 15) does not overlap any of the ranges of the first sub-partition of the first partition and is not encompassed by any ranges of the first partition. Therefore, the range can be stored in the first sub-partition, as shown in FIG. 6D. This maximizes the number of entries that can be stored by the first sub-partition of the first partition:

| P1 | | P2 |
|---|---|---|
| Sub-partition 1 | Sub-partition 2 | |
| (1500, 2500) | (1000, 2000) | (38, 7719) |
| (500, 1200) | | (0, 10000) |
| (20000, 28100) | | |
| (32000, 61000) | | |
| (17000, 18000) | | |
| (21, 22) | | |
| (10, 15) | | |

Because there is no space remaining in the first partition, and because there are no remaining bits available for use, no additional ranges can be stored. The ranges of the second sub-partition of the first partition are then moved to the second partition The above method of separating out non-overlapping ranges from overlapping ranges can be repeated on the second partition to ensure sufficient bit space. In other words, the second partition can be split into multiple sub-partitions, where earlier sub-partitions containing "non-overlapping" ranges are encoded using the first partition encoding scheme (unique bit sequences) and later sub-partitions having encompassing/overlapping ranges are encoded using the second partition encoding scheme (single-bit identifiers).

Because no space remains in the extra bits, any additional MCORs are ignored and are instead encoded using conventional methods. Meanwhile, a single bit of the ACL extra bits is assigned to each of the second partition ranges and unique 3-bit codes are assigned to each of the first sub-partition ranges (because the first sub-partition requires three bits for representation. The above example is shown below:

| Range | Encoding in TCAM extra bits for non-overlapping ranges | Encoding in TCAM extra bits for overlapping/encompassing ranges |
|---|---|---|
| (38, 7719) | xxx | xx1 |
| (0, 10000) | xxx | x1x |
| (1000, 2000) | xxx | 1xx |
| (1500, 2500) | 001 | xxx |
| (500, 1200) | 010 | xxx |
| (20000, 28100) | 011 | xxx |
| (32000, 61000) | 100 | xxx |
| (17000, 18000) | 101 | xxx |
| (21, 22) | 110 | xxx |
| (10, 15) | 111 | xxx |
| Other | xxx | xxx |

As shown in the above example, although a conventional method may be capable of storing only six or fewer entries in the six extra bits of the ACL, the above example is capable of storing ten entries in the six extra bits. Significant additional storage can be obtained for a larger number of available extra bits. In addition, performing the above description without bit restriction can provide significant compression over conventional range storage techniques.

It should be noted, that any single port range (e.g., a range containing only a single port) can be excluded from the algorithm to further enhance storage capabilities. In particular, although the algorithm can be performed on a single port range, doing so provides no storage advantage over storing that range using conventional technique because that range will always only require a single TCAM entry using the conventional methods.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
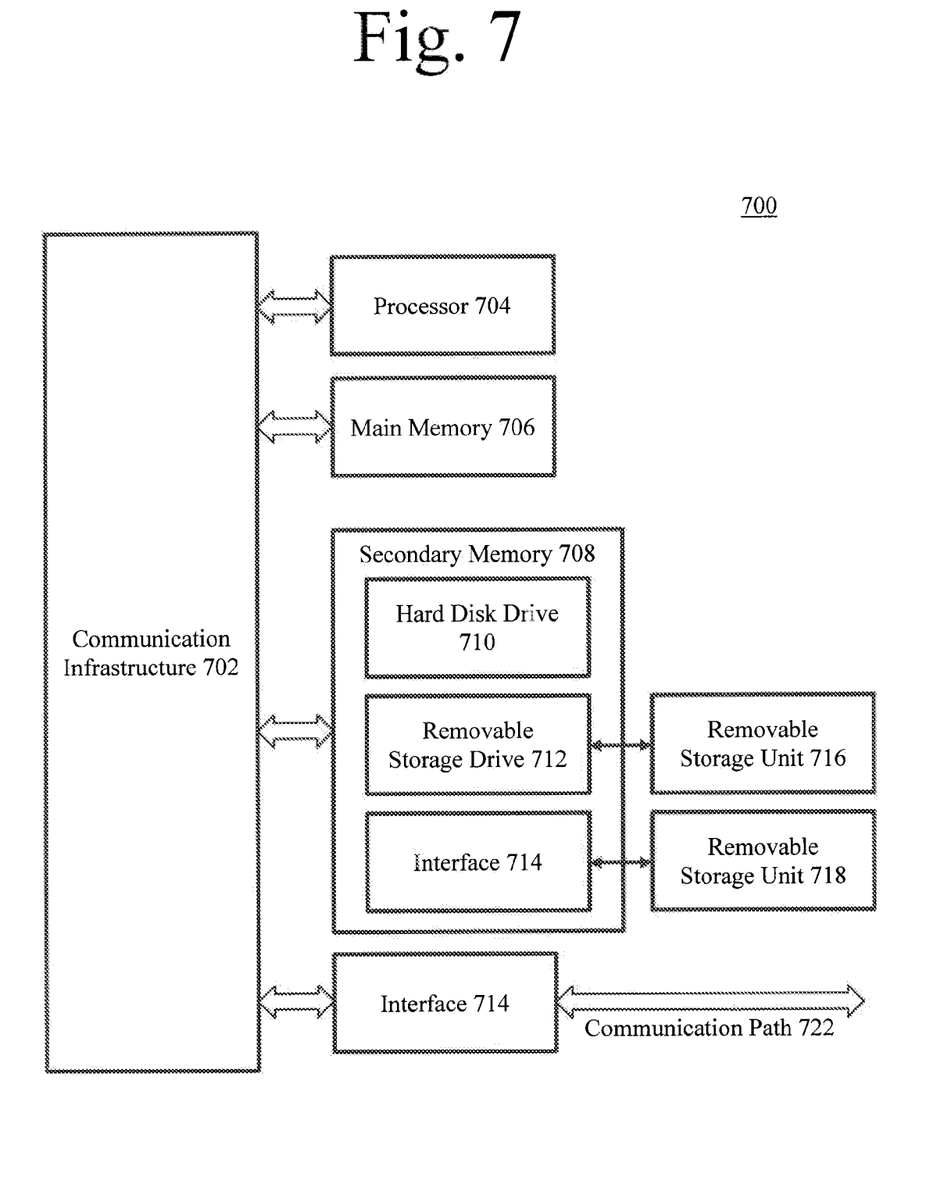
FIG. 7 illustrates a block diagram of an exemplary computer system that can be used to implement aspects of the present disclosure

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. One or more of the modules depicted in the previous figures can be implemented by one or more distinct computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like.

Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCMCIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A router, comprising:
   a communication interface configured to receive a data packet;
   a ternary content-addressable memory (TCAM) circuit, including:
      a rule memory that stores a plurality of rules in association with corresponding port ranges, the rule memory having a plurality of unused bits;
      an assignment circuit configured to encode a plurality of most commonly occurring ranges of the port ranges so as to occupy one or more of the plurality of unused bits, the assignment circuit separating the plurality of unused bits into a first virtual partition designated for a non-overlapping range from among the plurality of most commonly occurring ranges and a second virtual partition designated for an overlapping range from among the plurality of most commonly occurring ranges;
      a processor configured to determine at least one rule from among the plurality of rules applicable to the data packet based on the encoded plurality of most commonly occurring ranges; and
      a priority circuit configured to select a final rule from among the at least one rule applicable to the data packet; and
   a rule execution circuit configured to execute the selected final rule on the data packet.

2. The router of claim 1, wherein the non-overlapping range does not encompass any other range in the first virtual partition, and is not encompassed by any other range in the first virtual partition.

3. The router of claim 1, wherein the overlapping range encompasses a range in the first virtual partition.

4. The router of claim 1, wherein the assignment circuit is configured to encode each range in the second virtual partition so as to be identified by a single bit from among the plurality of unused bits.

5. The router of claim 1, wherein the assignment circuit is configured to encode each of the non-overlapping ranges so as to be identified by a unique bit sequence.

6. The router of claim 5, wherein the unique bit sequence has a length equal to a number of bits allocated to the first virtual partition, 7. The router of claim 1, wherein the TCAM circuit is configured to encode at least one of a source port and a destination port of the received data packet, and
   wherein the processor is configured to determine the at least one rule applicable to the data packet based on the at least one of the encoded source port and the encoded destination port.

8. A router, comprising:
a memory that stores a plurality of rules in association with corresponding port ranges;
an assignment circuit configured to encode a plurality of most commonly occurring ranges from among the port ranges so as to occupy unused bits of the stored plurality of rules, the assignment circuit being configured to encode a first subset of the plurality of most commonly occurring ranges so as to each be identified by a unique bit sequence,
wherein the assignment circuit is configured to separate the unused bits into a first virtual partition and a second virtual partition, and
wherein the first subset of the plurality of most commonly occurring ranges is designated for the first virtual partition.

9. The router of claim 8, wherein each range of the first subset does not encompass any other range of the first subset.

10. The router of claim 8, wherein the assignment circuit is configured to encode a second subset of the plurality of most commonly occurring ranges so as to be identified by a single bit, and
wherein the second subset is designated for the second virtual partition.

11. The router of claim 9, wherein each unique bit sequence has a length equal to a number of bits of the first virtual partition.

12. The router of claim 8, wherein the assignment circuit is configured to separate the second virtual partition into a first sub-partition and a second sub-partition,
wherein the assignment circuit is configured to extract, from among the first subset, overlapping ranges that partially overlap with other ranges in the first subset to be designated for the first sub-partition of the second virtual partition, and
wherein the assignment circuit is configured to encode each of the extracted overlapping ranges so as to each be identified by a unique bit sequence equal in length to a number of bits of the first sub-partition of the second virtual partition.

13. The router of claim 8, wherein the assignment circuit is configured discard single-port ranges so as not to be encoded into the unused bits.

14. A method of encoding a plurality of most commonly occurring ranges in a router, comprising:
creating a first virtual partition and a second virtual partition in a plurality of unused bits of a stored rule;
assigning a current range to the first virtual partition or the second virtual partition depending on whether the current range encompasses a second range assigned to the first virtual partition; and
encoding ranges assigned to the first virtual partition using a first encoding scheme and encoding ranges assigned to the second virtual partition using a second encoding scheme.

15. The method of claim 14, wherein the ranges assigned to the first virtual partition are each non-overlapping with the other ranges assigned to the first virtual partition.

16. The method of claim 14, wherein the first encoding scheme includes assigning a unique bit sequence equal in length to a number of bits allocated to the first virtual partition.

17. The method of claim 14, wherein the second encoding scheme includes assigning a single bit to each range of the second virtual partition.

18. The method of claim 14, further comprising determining whether space is available for the current range based on which of the first virtual partition or the second virtual partition to which the current range is assigned.

19. The method of claim 18, wherein the determining includes:
determining, when the current range is assigned to the first virtual partition, whether a number of entries already stored in the first virtual partition is equal to $2^b-1$, where b represents the number of bits allocated to the first virtual partition; and
determining, when the current range is assigned to the second virtual partition, whether the total number of bits currently allocated to the combination of the first virtual partition and the second virtual partition exceeds the number of unused bits of the stored rule.

20. The method of claim 19, wherein the determining further includes:
determining, when the current range is assigned to the first virtual partition and the number of entries already stored in the first virtual partition is equal to $2^b-1$, whether the total number of bits currently allocated to the combination of the first virtual partition and the second virtual partition exceeds the number of unused bits of the stored rule.

* * * * *

UNITED STATES PATENT AND TRADEMARK OFFICE
CERTIFICATE OF CORRECTION

PATENT NO.        : 8,909,857 B2
APPLICATION NO.   : 13/538651
DATED             : December 9, 2014
INVENTOR(S)       : Parineeth M. Reddy It is certified that error appears in the above-identified patent and that said Letters Patent is hereby corrected as shown below:

In the Claims

Column 16, line 60, please replace "partition," with --partition.--.

Column 17, line 12, please replace "hits" with --bits--.

Column 17, line 42, please replace "configured discard" with --configured to discard--.

Signed and Sealed this
Seventh Day of April, 2015

Michelle K. Lee
*Director of the United States Patent and Trademark Office*